United States Patent Office 3,367,837
Patented Feb. 6, 1968

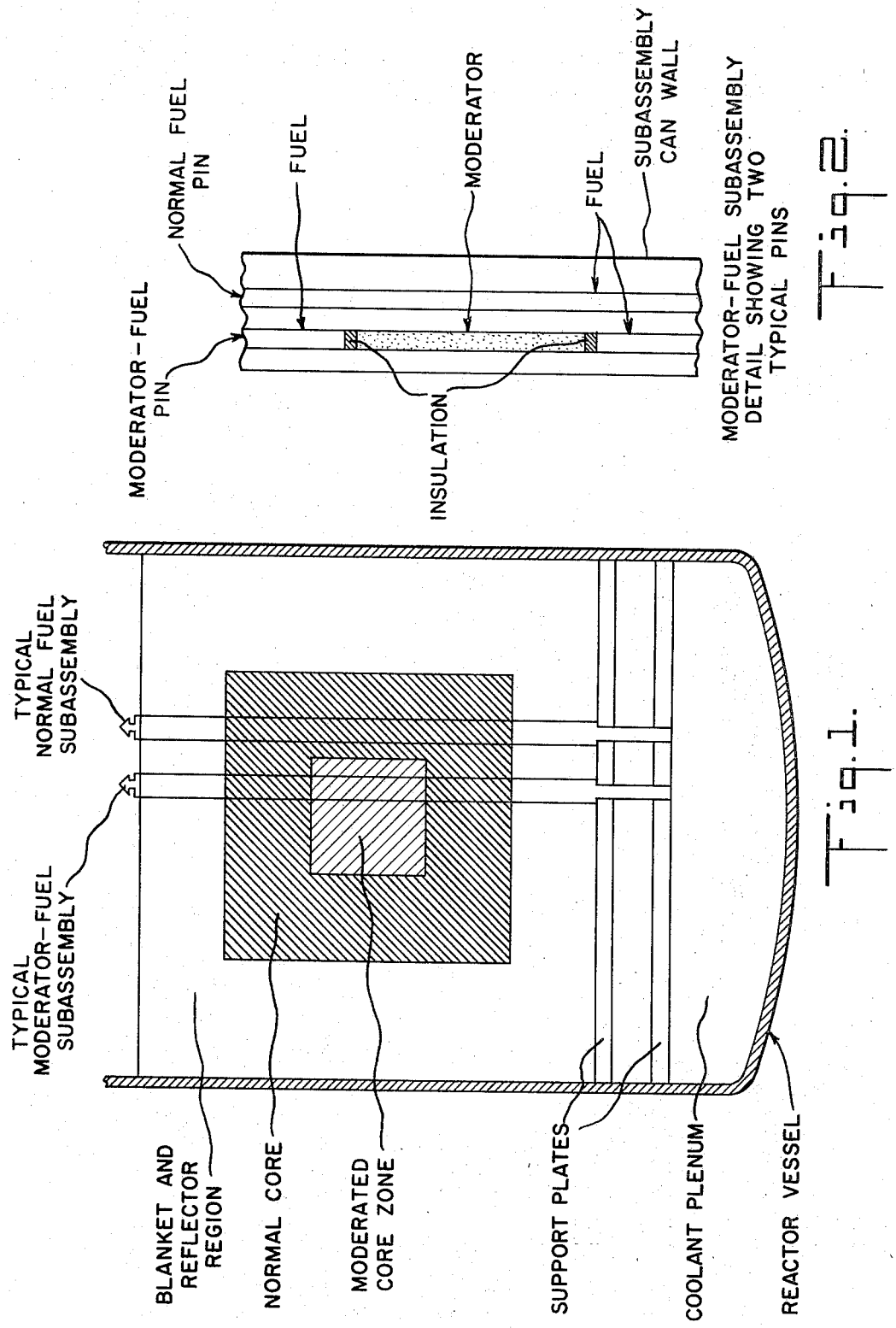

3,367,837
MINIMIZING THE POSITIVE SODIUM VOID CO-EFFICIENT IN LIQUID METAL-COOLED FAST REACTOR SYSTEMS
John B. Nims, Royal Oak, and Earl M. Page, Madison Heights, Mich., assignors to Atomic Power Development Associates, Inc., Detroit, Mich., a corporation of New York
Filed Oct. 24, 1965, Ser. No. 504,432
5 Claims. (Cl. 176—18)

This invention relates to sodium-cooled or other liquid metal-cooled fast reactor systems and more particularly to the problem of eliminating or minimizing the so-called positive sodium void coefficient which tends to occur with large reactors of that type.

Upon the occurrence of voiding or losses of sodium in the cores of such reactors due to any cause, the result is first a reduction in the moderation effect of the sodium which causes an increase in the neutron energy and an increased reactivity, tending to establish a so-called positive sodium void coefficient, and secondly, the voiding tends to increase leakage of neutrons from the core regions thereby tending to decrease reactivity and to give rise to a negative void coefficient. But such leakage is essentially an effect which is most pronounced in the outer surface or edges of the core system and is not so significant as to voids which occur in the middle zones of the core. Thus for small reactors, the leakage effect outweighs the effects due to reducing moderation so that the positive sodium void coefficient problem does not ordinarily occur substantially with such small reactors. But for large reactors conversely, the reduction of the moderation effect may outweigh the leakage effect. Thus, assuming that a small disturbance or accident occurs in a large sodium-cooled reactor, giving rise to voids or greater voids, then if any substantial tendency toward increased reactivity results, there will be an increase in power generated which results in the voiding problem becoming worse. Although the aforesaid effect of causing reduction in moderation essentially may occur over the whole core, it is much more pronounced in the central regions.

Ordinarily it is preferable that there be a slightly negative sodium void coefficient in such fast reactors, although certain factors may so alter the situation that a somewhat positive coefficient may be tolerated with safety.

The increase in reactivity upon loss of sodium (positive sodium void coefficient) which is characteristic of large advanced sodium-cooled fast reactor systems, presents a problem to the designers of such systems in their effort to select a core configuration which will be satisfactory as to its safety implications. Thus it has been proposed to circumvent this problem with large reactors by selecting a core geometry which will permit high neutron leakage which tends to occur, for example, if the core is shaped like a flat cylinder or more or less disc-like, or as an annulus, or if a modular core is used containing several loosely coupled smaller cores of more conventional shape. But such designs inherently possess the disadvantages of a low in-core breeding ratio and high critical mass. The penalties attached to these disadvantages are that the low internal breeding ratio leads to the necessity of a more complex and expensive control system in order to provide a greater amount of reactivity needed for burnup and the larger fuel inventory adds appreciably to the fuel cycle costs. For these reasons, there has been a need for a solution of this positive sodium void coefficient problem which will permit the use of conventional core geometry.

In arriving at an alternative solution of this problem, we have borne in mind that the void coefficient is positive only in the central parts or regions of the core where the neutron leakage component is generally insignificant, such leakage component being negative and dominant in the regions near the core boundaries. Thus, according to one aspect of the present invention, we have made use of the possibility of introducing a local modification of the core composition at the central regions thereof rather than one that extends over the entire core region. That is, the desired result is obtained by introducing a fixed moderator material in the central regions of the core and the invention makes use of the variation of neutron importance with energy, and the energy distribution of the neutron flux. It is characteristic of advanced fast reactors that the slowing down of neutrons in the energy range above approximately 10 kev. produces a negative reactivity change, while slowing down at lower energys causes a positive change. Depending upon the energy distribution of the neutron flux, neutron slowing down by sodium can produce a net local reactivity effect that is either positive or negative. In the usual fast reactor designs, the flux comes to a peak at an energy level at about 200 kev. and thus the moderating component of a sodium void effect tends to be positive. Thus, we have conceived that the void effect can be made more negative by shifting the flux spectrum toward the low energy range and in the application of this technique, this flux shift in accordance with the invention is accomplished by introducing a solid moderator material in the central regions of the core as above stated.

In addition to the effect described above, this additional moderation would also tend to reduce the absolute magnitude of the sodium void effect whether it be positive or negative due to the fact that the voiding of sodium would have a less significant effect on the moderating properties of the system if the sodium constitutes a smaller part of the total moderator present.

Further aspects, features and advantages of the invention will more clearly appear from the following description taken in connection with the accompanying drawings.

In the drawings.

FIG. 1 is a schematic diagram of a reactor embodying the invention and showing various typical parts and regions as in vertical cross-section;

FIG. 2 is a diagrammatic view with the upper and lower end portions broken away of a typical fuel sub-assembly such as may be used in the central core region in accordance with the invention.

Figure 3:
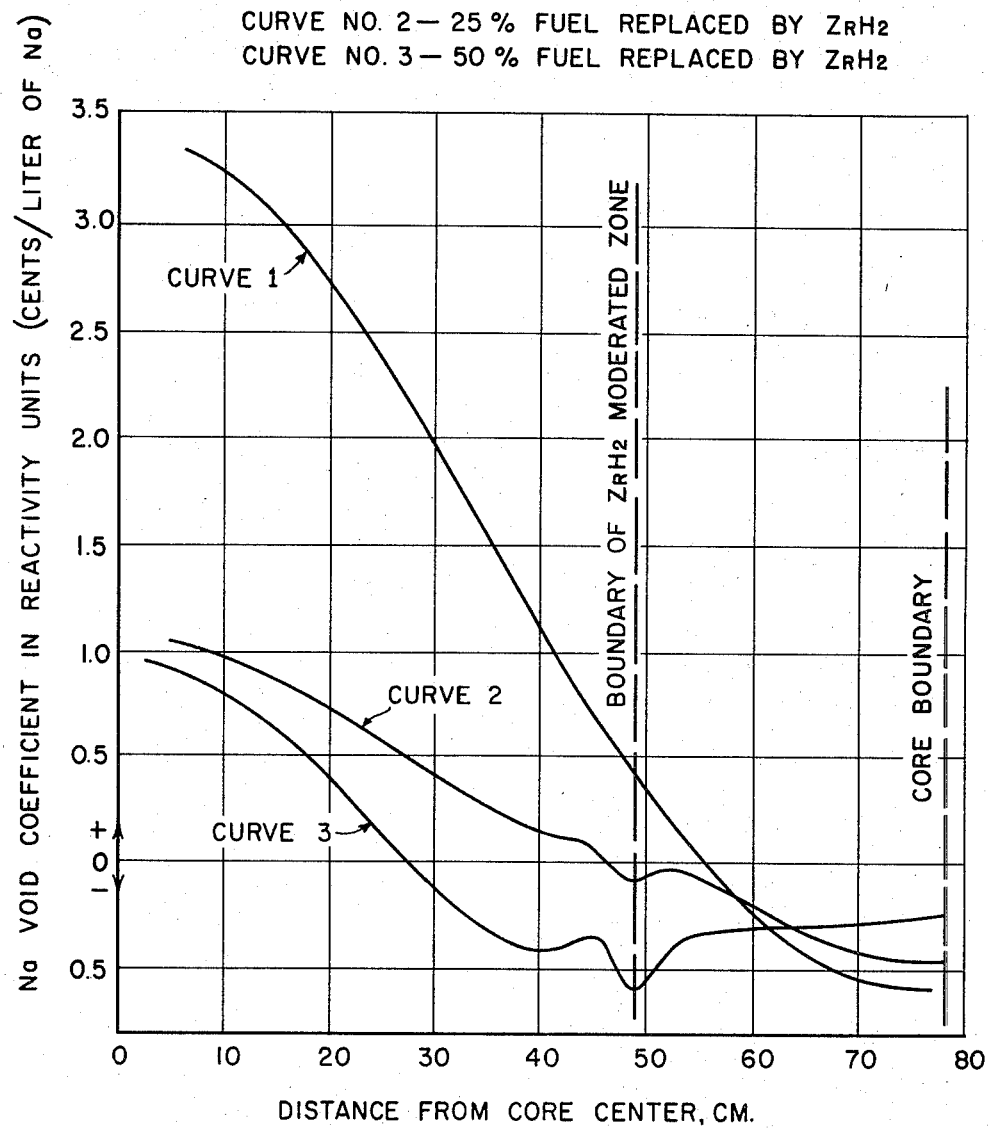
FIG. 3 comprises certain graphs illustrating the effect on the sodium void coefficient of the zoned addition if moderating material in the form for example of zirconium hydride.

Referring now to FIG. 1 in further detail, it will be noted that there is here shown a reactor vessel having a normal core region and which has a compact form of geometry. Within the central or middle portions of this core region, there is indicated in different cross hatching a moderated core zone in accordance with the invention. The core region around its sides and above and below is surrounded by a blanket and reflector region of a suitable type conventional for this class of reactor. A typical one of the normal fuel sub-assemblies is here indicated as extending from the top of the blanket region down through the normal core region and through the lower blanket region to suitable supporting plates. It will be understood that this is merely a schematic showing of one of these typical normal fuel sub-assemblies of which there would be a large number in the complete reactor. Also, there is here shown a typical one of the moderator-fuel sub-assemblies extending from the top down to the supporting plates in the reactor and it will be understood that there will be a considerable number of the sub-assemblies of this type extending down through the moderator core zone. The normal fuel sub-assemblies may be of suitable known conventional types.

FIG. 2 shows in further detail that portion of a typical one of the moderator fuel sub-assemblies which extends down through the normal core region as well as the moderated middle core region contained therein. That is, such sub-assembly will be contained in a can-like wall the same as are the typical normal fuel sub-assemblies and such sub-assembly will contain a number of the so-called normal type of fuel pins of which a typical one is shown and also a number of moderator-fuel pins of which a typical one is also shown and which at its mid portions contains a body of moderator material as shown separated at its upper and lower ends by suitable insulation from the fuel contained in the uppermost and lowermost portions of such fuel pin.

It has been heretofore determined that in the usual case the positive coefficient zone in such large reactors at least with a compact type of core bodies such as here shown is confined substantially to the central one-third of the core (as measured across the core in any direction). In the vicinity of the boundary of this central portion, the void coefficient is very small and then becomes negative in the outer regions of the core. The fact that the positive zone occupies only a fraction of the core is important for the reason that it is preferable to limit the soft spectrum region in accordance with the invention to the minimum volume. It is in this inner zone that part of the fuel be replaced by moderator material. The moderator may be mixed with the fuel or preferably placed in separate pins as indicated in FIG. 2, depending on the compatibility of the two materials. In the analyses described herein, $ZrH_2$ has been used as the moderator material and to prevent its decomposition, it is located in portions of separate pins.

However, the invention is not necessarily limited to the use of moderating material comprising zirconium hydride as it is believed that beryllium oxide will yield similar results although it will require about twice the volume fraction of BeO to achieve a given effect. Also yttrium hydride may possibly be used.

The method of the present invention has been investigated using spherical geometry, for 2,000 and 4,000 liter fast oxide cores. In the central 25% of the total core volume in which the void coefficient is positive, up to some 50% of the fuel was replaced with moderator material in the form of $ZrH_2$, the fuel enrichment was uniformly adjusted to maintain a critical system and the sodium worth was calculated by means of perturbation theory. The results are shown by the curves of FIG. 3 which indicate the effect of the zoned $ZrH_2$ addition, on the sodium void coefficient in a 2,000 liter oxide core.

A measure of the possibilities of this technique is evident from the fact that upon integrating the void coefficient over all the core regions where the coefficient was positive with this core, the sodium void coefficient in such a case was reduced from a maximum positive effect of some $2.6 on the base case to only 11 cents in the example where 50% of the fuel had been replaced by moderator. As will be noted in FIG. 3, the local sodium void coefficient is made significantly more negative over the entire inner zone although in the more central regions a small positive worth still exists but not to an ordinarily prohibitive extent, and in the remaining portions of the middle regions, the coefficient becomes slightly negative.

A further advantage of the invention is that of providing savings in the fuel inventory over and above that achieved in a low leakage geometry for the purpose. However, the softer spectrum near the core center produces the disadvantage of a larger power peaking factor and a reduced breeding ratio. Thus the overall merits of this zoned spectrum solution of the problem can be appreciated more readily from the following results obtained from investigation of the 4,000 liter core. The following analysis includes the effect of adjusting the inner zone enrichment to reduce the undesirable power peaking and to minimize the reduction in breeding ratio. The following Table I indicates the results.

TABLE I.—EFFECT OF FUEL REPLACEMENT BY $ZrH_2$ IN CENTRAL 25 PERCENT OF CORE VOLUME
[4,000 liter mixed oxide]

| Fuel Replaced by $ZrH_2$ (Volume Percent) | Pu-239 Critical Mass (Kgs.) | Na Void Coefficient ($) | Maximum Positive Na Void Effect ($) | Core Power Ratio (Max./Av.) | Breeding Ratio | |
|---|---|---|---|---|---|---|
| | | | | | Internal | Total |
| 0 | 1,306 | 3.0 | 4.0 | 2.2 | 1.0 | 1.5 |
| 12.5 | 1,213 | 0.4 | 1.9 | 2.9 | 0.8 | 1.2 |
| 25 | 1,114 | 0.3 | 1.5 | 3.9 | 0.7 | 1.0 |

Thus replacing 12½% of the fuel with moderator in the 4,000 liter core (using uniform enrichment) reduced the maximum positive and total core void coefficients from $4.0 and $3.0 to $1.9 and $0.4 respectively (the maximum positive effect is obtained by integrating the void effect over only the positive zone). The internal and total breeding ratios reduce from about 1.0 and about 1.5 to about 0.8 and about 1.2. There is an improvement in critical mass from 1306 kg. to about 1213 kg. The maximum to average power density ratio increases rather markedly from about 2.2 to 2.9.

The power distribution deterioration and internal breeding loss may be restored by reducing the inner zone fuel enrichment. These effects are indicated in another example of the following Table II in which the central zone fuel enrichment is 85% of that in the outer zone.

TABLE II.—EFFECT OF ZONED ENRICHMENT WITH 12.5 (VOL. PERCENT) OF FUEL REPLACED BY $ZrH_2$ IN CENTRAL 25% OF CORE VOLUME
[4,000 liter mixed oxide]

| Inner Zone Enrichment (Percent of outer Zone Enrichment) | Na Void Coefficient ($) | Maximum Positive Na Void Effect ($) | Core Power Ratio (Max./Av.) | Breeding Ratio | |
|---|---|---|---|---|---|
| | | | | Internal | Total |
| Unmoderated Base Case | 3.0 | 4.0 | 2.2 | 1.0 | 1.5 |
| 100 | 0.4 | 1.9 | 2.9 | 0.8 | 1.2 |
| 85 | 0.8 | 2.5 | 2.3 | 0.9 | 1.3 |

The power density ratio is essentially that of the unmoderated core and the breeding ratios, both in-core and total, are partly restored. The improvement in the void coefficients is reduced, but the major part of the improvement achieved by the spectral softening is retained.

In assessing the accomplishments of the objectives of this invention, it should be observed that, based on earlier studies of 1000 mwe. cores, use of high leakage core geometry to gain similar improvements in the void coefficient resulted in critical mass penalties of 30% or more, and internal breeding ratios in the range of 0.5 to 0.6. The comparison is therefore being made with these values rather than with the base case numbers which refer to a core design unmodified for improvement in the void coefficient. On this basis it appears clear that the zoned spectrum core approach gives distinct improvements and advantages over the use of the high leakage core approach involving cores of modified geometry. Another aspect relating to safety that is obviously affected is the Doppler coefficient. Without considering this in detail, it is contemplated that its magnitude will be increased substantially in the central zone as a result of the spectrum softening and therefore improve the inherent reactor response in accident situations.

While the invention has been disclosed specifically as applied to sodium-cooled reactors, various aspects of the invention may be applicable to other types of liquid-cooled reactors and the specification and appended claims should be interpreted in the light of that possibility.

Although certain examples of the invention are herein disclosed for purposes of explanation, various further modifications after study of this specification will be apparent to those skilled in this art and reference should accordingly be had to the appended claims in determining the scope of the invention.

What is claimed and desired to be secured by Letters Patent is:

1. A large liquid-metal cooled fast breeding reactor having a core comprising a transverse and longitudinally defined middle region and an outer region, said outer region having a plurality of fissile fuel elements, the total of the fissile fuel elements being sufficient for sustaining a fast nuclear chain reaction, and said middle region having a substantial proportion of spaced moderator elements for shifting the flux spectrum in said core towards the low energy range, said outer region containing substantially no moderator, whereby the void coefficient for said middle region has only slightly positive or negative values.

2. A liquid-metal cooled fast nuclear reactor according to claim 1 wherein said middle region comprises about one-third of the core volume.

3. A liquid-metal cooled fast nuclear reactor according to claim 1 wherein said moderator elements comprise up to about 50% of the fuel volume of the middle region.

4. A liquid-metal cooled fast nuclear reactor according to claim 1 wherein said moderator elements are fabricated from zirconium hydride.

5. A liquid-metal cooled fast nuclear reactor according to claim 1 wherein said fuel elements comprise subassemblies each containing a plurality of fuel pins, said moderator elements comprising a mid portion of a plurality of pins which extend into the middle region of the core and which contain moderator material.

References Cited

UNITED STATES PATENTS

| | | | |
|---|---|---|---|
| 3,119,747 | 1/1964 | Wallace et al. | 176—71 |
| 3,128,234 | 4/1964 | Cage et al. | 176—71 X |
| 3,197,376 | 7/1965 | Balent et al. | 176—40 |
| 3,215,606 | 11/1965 | Silvester | 176—40 |
| 3,253,997 | 5/1966 | Abbott | 176—71 X |
| 3,266,998 | 8/1966 | Greebler | 176—41 |

OTHER REFERENCES

Proceedings of the Second United States Nations International Conference on the Peaceful Uses of Atomic Energy, vol. 12 (1958), pp. 28–31 (Loewenstein et al.) p. 102 (Smith et al.) p. 121 (Lung et al.).

REUBEN EPSTEIN, *Primary Examiner.*